(12) United States Patent
Ouwerkerk et al.

(10) Patent No.: US 9,255,333 B2
(45) Date of Patent: Feb. 9, 2016

(54) HIGH PRESSURE PROTON EXCHANGE MEMBRANE BASED WATER ELECTROLYZER SYSTEM

(75) Inventors: David B. Ouwerkerk, Torrance, CA (US); Nelson A. Kelly, Sterling Heights, MI (US); Thomas L. Gibson, Utica, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 2115 days.

(21) Appl. No.: 12/251,822

(22) Filed: Oct. 15, 2008

(65) Prior Publication Data

US 2010/0089747 A1   Apr. 15, 2010

(51) Int. Cl.
  *C25B 1/12* (2006.01)
  *C25B 9/00* (2006.01)
  *C25B 9/18* (2006.01)
  *C25B 1/04* (2006.01)
  *B60L 11/18* (2006.01)

(52) U.S. Cl.
  CPC ............... *C25B 1/12* (2013.01); *B60L 11/1879* (2013.01); *C25B 9/00* (2013.01); *C25B 9/18* (2013.01); *Y02E 60/366* (2013.01); *Y02T 10/7005* (2013.01); *Y02T 10/705* (2013.01)

(58) Field of Classification Search
  USPC ............................. 204/266, 260; 205/628–639
  See application file for complete search history.

(56) References Cited

U.S. PATENT DOCUMENTS

| | | | |
|---|---|---|---|
| 3,134,689 A | | 5/1964 | Pritikin et al. |
| 4,040,938 A | * | 8/1977 | Robertson ..................... 204/283 |
| 4,272,353 A | | 6/1981 | Lawrance et al. |
| 6,890,410 B2 | * | 5/2005 | Sullivan ........................ 204/258 |
| 2004/0084302 A1 | * | 5/2004 | Nakazawa et al. ............. 204/282 |
| 2006/0249393 A1 | * | 11/2006 | Ghosh et al. .................. 205/639 |
| 2007/0151865 A1 | * | 7/2007 | Shimko et al. ................ 205/628 |
| 2007/0227899 A1 | * | 10/2007 | McClaine et al. ............. 205/637 |
| 2008/0202942 A1 | * | 8/2008 | Wilkinson et al. ............. 205/742 |
| 2009/0090313 A1 | * | 4/2009 | Henry, Sr. ........................ 123/3 |
| 2010/0192771 A1 | * | 8/2010 | Pientka ............................. 95/95 |

OTHER PUBLICATIONS

Srinivasan, S., "Recent Advances in Solid Polymer Electrolyte Fuel Cell Technology wiht Low Platinum Loading Electrodes", Journal of Power Sources, 29, (1990) pp. 367-387.
Highfield, Jim, "Greenwinds", http://web.archive.org/web/20071017021957/http://www.pege.org/greenwinds/electrolyzer.htm, last modified Aug. 29, 1999.

* cited by examiner

*Primary Examiner* — Nicholas A Smith
*Assistant Examiner* — Brian W Cohen
(74) *Attorney, Agent, or Firm* — BrooksGroup

(57) ABSTRACT

A high pressure proton exchange membrane based water electrolyzer system that may include a series of proton exchange membrane (PEM) cells that may be electrically coupled together and coupled to a proton exchange membrane to form a membrane electrode assembly (MEA) that is spiral wound onto a conductive center post, wherein an innermost PEM cell of the MEA may be electrically connected with the conductive center post, or center electrode, and wherein an outermost PEM cell of the MEA may be electrically coupled to pressure vessel cylinder, or outer electrode. Each PEM cell may include an anode portion and a cathode portion separated by a portion of the PEM membrane. In addition, a non-permeable separator layer may also be spiral wound around the conductive center post and separates the wound portions of the PEM core.

26 Claims, 2 Drawing Sheets

HIGH PRESSURE PROTON EXCHANGE MEMBRANE BASED WATER ELECTROLYZER SYSTEM

TECHNICAL FIELD

The field to which the disclosure generally relates includes electrolyzers, and more specifically to a high pressure proton exchange membrane based electrolyzer system.

BACKGROUND

Electrolyzers convert abundant chemicals into more valuable ones by the passage of electricity, normally by breaking down compounds into elements or simpler products. A proton exchange membrane based water electrolyzer (or PEM-based water electrolyzer) is a system in which water is oxidized at an oxygen electrode, or cell anode, to produce oxygen gas, releasing hydrogen ions, or protons, and electrons. The hydrogen ions migrate through a solid polymer electrolyte from the cell anode to the cell cathode, or hydrogen electrode, under the effect of the electric field imposed across the cell, while the electrons are transferred to the cathode by a direct current (DC) power source. The protons and electrons recombine at the cell cathode to produce hydrogen. Oxygen and hydrogen are generated in a stoichiometric ratio—two volume units of hydrogen for every one of oxygen—at a rate proportional to the applied cell current. A high pressure water electrolyzer may generate hydrogen and oxygen gas at pressures sufficient for storage (up to or exceeding 10,000 pounds per square inch) without the need for mechanical compression.

SUMMARY OF EXEMPLARY EMBODIMENTS OF THE INVENTION

A high pressure proton exchange membrane based water electrolyzer system in accordance with one exemplary embodiment may include an outer electrode having an interior region and water inlet; a gas outlet coupled within another portion of the outer electrode; a center electrode coupled within the interior region and electrically coupled to the outer electrode through a direct current power source; a membrane electrode assembly having a plurality of proton exchange membrane cells spiral wound around the center electrode within the interior region, wherein an innermost one of said plurality of proton exchange membrane cells may be electrically coupled to the center electrode and wherein an outermost one of the plurality of proton exchange membrane cells may be electrically coupled to the outer electrode; and a non-conductor separator member wound around the center electrode and coupled to the center electrode and the outer electrode, the non-conductor separator membrane preventing electrical contact between the plurality of proton exchange membrane cells. The center electrode may be an anode when the outer electrode is a cathode, or alternatively the center electrode may be a cathode with the outer electrode is an anode.

In another exemplary embodiment, the high pressure proton exchange membrane based water electrolyzer system substantially as described above may also include additional structure that aids in separating the hydrogen and oxygen gas generated in the high pressure proton exchange membrane based water electrolyzer system via gravity stratification prior to exiting the system.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings, wherein.

DETAILED DESCRIPTION OF EXEMPLARY EMBODIMENTS

The following description of the embodiment(s) is merely exemplary (illustrative) in nature and is in no way intended to limit the invention, its application, or uses.

Figure 1:
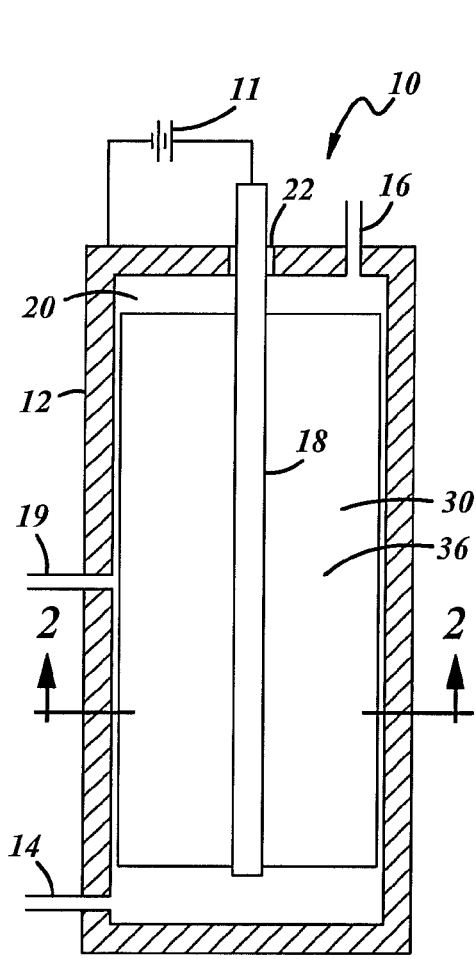
FIG. 1 is a cutaway view of a high pressure proton exchange membrane based water electrolyzer system in accordance with one exemplary embodiment.
Figure 2:
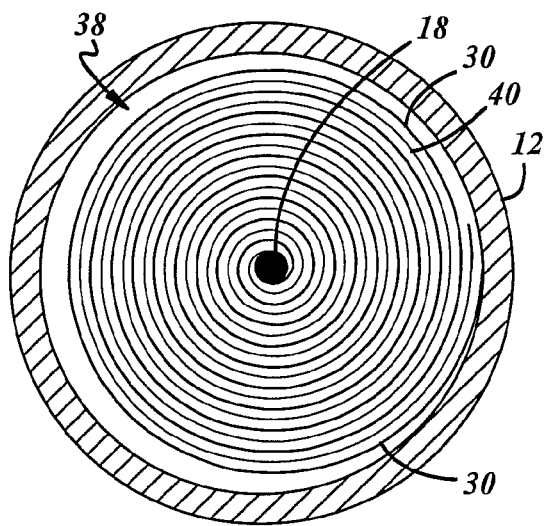
FIG. 2 is a section view of the vessel of FIG. 1 taken along line 2-2.
Figure 3:
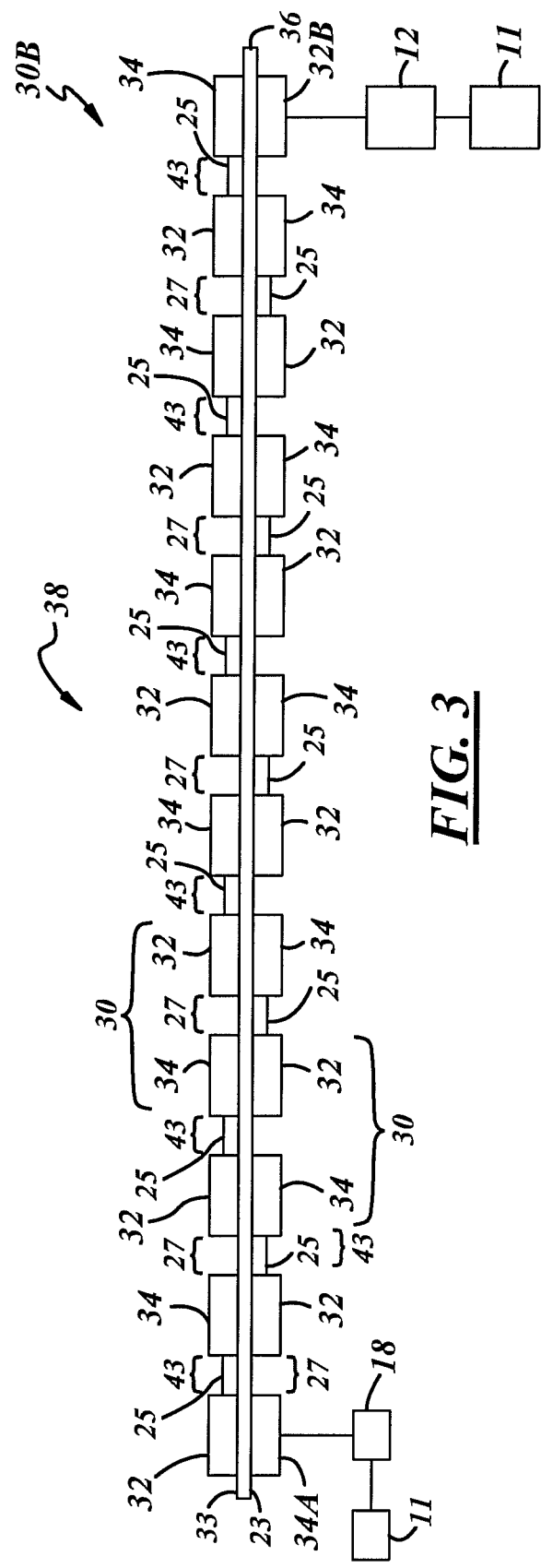
FIG. 3 is a perspective view of the membrane electrode assembly of FIG. 2 in an unrolled and unfolded position.

Referring first to FIGS. 1-3, a high pressure proton exchange membrane based water electrolyzer system 10 in accordance with one exemplary embodiment may include a pressure vessel cylinder, or outer electrode 12, having a water inlet 14 and a gas outlet 16. A water level sensor 19 may also be coupled within the vessel 10 that indicates the water level in the interior portion 20 of the outer electrode 12. The water level sensor 19 communicates with a check valve portion of the water inlet 14 to move it between an open position and a closed position to allow water to enter the interior portion through the water inlet 14 when the sensor 19 indicates that the water level within the interior portion 20 is too low.

The system 10 may also include a conductive center post, or center electrode 18, that is partially contained within the interior portion 20 of the outer electrode 12 and extends outside the system 10 through an insulated feed-through portion 22. The outer electrode 12 and center electrode 18 may either be an anode electrode or a cathode electrode, wherein the outer electrode 12 is an anode electrode when the center electrode 18 is a cathode electrode and wherein the outer electrode 12 is a cathode electrode when the center electrode 18 is an anode electrode. The outer electrode 12 and center electrode 18 may each be electrically coupled to each other via a direct current (DC) power source 11. The outer electrode 12 and center electrode 18 therefore form the positive terminal and negative terminal of the DC power source 11.

As shown best in FIG. 2, a membrane electrode assembly, or MEA 38, may be wound around the center electrode 18 within the interior 20 of the outer electrode 12. Also shown best in FIG. 2 is a non-permeable separator layer 40 that may separately wound around the center electrode 18 within the interior 20 of the outer electrode and may be coupled to both the center electrode 18 and the outer electrode 12. The non-permeable separator layer 40 may aid in preventing electrical contact between remote portions of the MEA 38 that is spiral wound and therefore in close proximity thereto. The non permeable separator layer 40 also, by implication, may substantially prevent the flow of water, or oxygen gas, or hydrogen gas, or hydrogen ions therethrough.

While the winding of both the MEA 38 and the non-permeable separator layer 40 in FIG. 2 are shown in a counter-clockwise rotation from the center electrode 18 to the outer electrode 12, a clockwise rotation from the center electrode 18 to the outer electrode 12 may also be utilized.

As best shown in FIG. 3, the MEA 38 may be formed from a series of electrically connected proton exchange membrane (PEM) cells 30 coupled in an alternating fashion on opposite sides 23, 33 of a PEM membrane 36. Each PEM cell 30 may include an anode electrode 32 and a cathode electrode 34 that are separated from each other by a gap 27.

Each PEM cell 30 is separated from an adjacent PEM cell 30 on one side 23 or the other side 33 of the membrane 36 by a gap 43. In addition, each PEM cell 30 may be electrically coupled to an adjacent PEM cell 30 located on the same side 23 or 33 of the PEM membrane 36 through an electrical connection 25 traversing the gap 43.

When the center electrode 18 is an anode electrode, as shown in FIG. 3, the anode electrode 34A of the innermost PEM cell 30 is electrically coupled to the center electrode 18 and the cathode electrode 32B of the outermost PEM cell 30 is electrically coupled to the outer electrode 12 (which is a cathode electrode) to complete the circuit.

Conversely, in the opposite arrangement not shown but contemplated herein, when the center electrode 18 is an cathode electrode and the outer electrode 12 is an anode electrode, the cathode electrode 32 of the innermost PEM cell 30 is electrically coupled to the center electrode 18 while the anode electrode 34 of the outermost PEM cell 30 is electrically coupled to the outer electrode 12 to complete the circuit.

The electrodes (both the cathode electrodes 32, 32B and the anode electrodes 34, 34A) may be catalyst layers which may include catalyst particles and an ion conductive material such as a proton conducting ionomer, intermingled with the particles. The proton conductive material may be an ionomer such as a perfluorinated sulfonic acid polymer. The catalyst materials may include metals such as platinum, palladium, and mixtures of metals such as platinum and molybdenum, platinum and cobalt, platinum and ruthenium, platinum and nickel, platinum and tin, other platinum transition-metal alloys, and other fuel cell electrocatalysts known in the art. The catalyst materials may be finely divided if desired.

A variety of different types of membranes may be used in embodiments of the invention. The solid polymer electrolyte membrane useful in various embodiments of the invention may be an ion-conductive material. Examples of suitable membranes are disclosed in U.S. Pat. Nos. 4,272,353 and 3,134,689, and in the Journal of Power Sources, Volume 28 (1990), pages 367-387. Such membranes are also known as ion exchange resin membranes. The resins include ionic groups in their polymeric structure; one ionic component for which is fixed or retained by the polymeric matrix and at least one other ionic component being a mobile replaceable ion electrostatically associated with the fixed component. The ability of the mobile ion to be replaced under appropriate conditions with other ions imparts ion exchange characteristics to these materials.

The ion exchange resins can be prepared by polymerizing a mixture of ingredients, one of which contains an ionic constituent. One broad class of cationic exchange, proton conductive resins is the so-called sulfonic acid cationic exchange resin. In the sulfonic acid membranes, the cationic exchange groups are sulfonic acid groups which are attached to the polymer backbone.

The formation of these ion exchange resins into membranes is well-known to those skilled in the art. The preferred type is perfluorinated sulfonic acid polymer electrolyte in which the entire membrane structure has ionic exchange characteristics. These membranes are commercially available, and a typical example of a commercial sulfonic perfluorocarbon proton conductive membrane is sold by E. I. DuPont de Nemours & Company under the trade designation Nafion®. Other such membranes are available from Asahi Glass and Asahi Chemical Company. The use of other types of membranes, such as, but not limited to, perfluorinated cation-exchange membranes, hydrocarbon based cation-exchange membranes as well as anion-exchange membranes are also within the scope of the invention In operation of the exemplary embodiment shown in FIGS. 1-3 (wherein the center electrode 18 (i.e. positive terminal of the DC power source 11) is an anode electrode electrically coupled to anode 34A and the outer electrode 12 (i.e. negative terminal of the DC power source 11) is an cathode electrode electrically coupled to cathode electrode 32B), water is introduced within the interior region 20 through the water inlet 14 when a water level sensor 19 indicates that the water level is too low. The water level sensor 19 directs the check valve portion of the water inlet 14 to an open position to allow the introduction of water.

The reactant water is in close proximity to the innermost anode electrode 34A, where a chemical reaction occurs to form the oxygen gas ($O_2$ gas), electrons, and hydrogen ions (protons). The chemical reaction may be facilitated by the positive terminal (here the center electrode 18) of a DC power source 11 being connected to the innermost anode electrode 34A and by a negative terminal (here the outer electrode 18) of the DC power source 11 being connected to the outermost cathode electrode 32B.

The electrons generated on anode electrode 34A travel to the center electrode 18 and then to the DC power source 11. The oxygen gas is discharged, while the hydrogen ions generated in this reaction migrate through the PEM membrane 36 from the first side 23 to the second side 33, and combine with electrons at the respective cathode electrode 32 (the electrons are supplied by the adjacent anode electrode 34) to produce hydrogen gas ($H_2$ gas).

A similar reaction takes place at each of the other anode electrodes 34 and cathode electrodes 32 to generate oxygen gas and hydrogen gas, respectively. Electrons generated at the anode electrode 34 may be provided to the respective cathode electrodes 32 located on one side 23 or 33 through the electrical connection 25. Hydrogen ions generated at the anode electrode 34 may be provided to the respective cathode electrode 32 by migration through the PEM membrane 36. Excess electrons travel from the negative terminal of the DC power source 11 to the outer electrode 12 and then travel to the outermost cathode electrode 32B to complete the circuit.

Oxygen gas and hydrogen gas are generated in the system 10 in a stoichiometric ratio—two volume units of hydrogen gas for every one of oxygen gas—at a rate proportional to the applied cell current.

The cell voltage necessary to perform the electrolysis is a function of the number of PEM cells 30 connected in series to form the MEA 38. For a conventional single cell unit, a DC power source 11 having a voltage of approximately 1.6-2.4 volts may be sufficient to split water to generate oxygen and hydrogen gas. For a twelve PEM cell 30 unit such as shown in the exemplary embodiments of FIG. 3, the DC power source 11 voltage should be multiplied by twelve, and thus a DC power source 11 providing a minimum voltage of about 19.2-24 volts may be required. The current through the series of PEM cells, often called a PEM stack, will depend on the physical dimensions of the PEM stack and other characteristics, and thus the voltages described above may vary in order to attain the desired hydrogen production rate.

Figure 4:
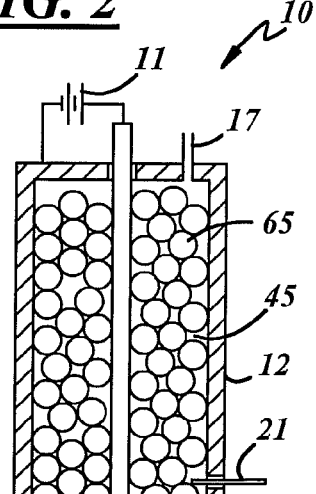
FIG. 4 is a cutaway view of a high pressure proton exchange membrane based water electrolyzer system in accordance with another exemplary embodiment.
Figure 4:
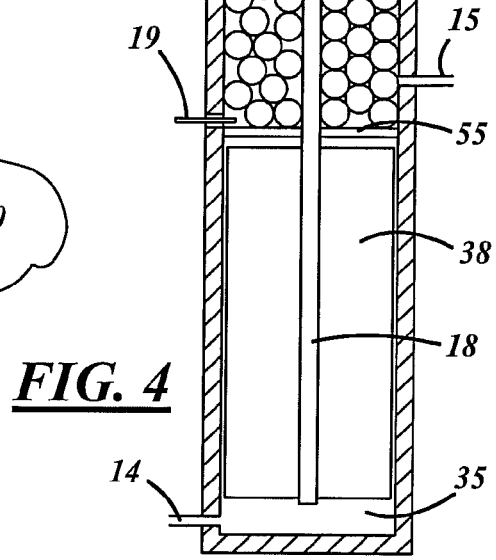

Referring now to FIG. 4, an alternative exemplary embodiment is depicted wherein a gas separator area, or second interior portion 45, may be introduced within the vessel 10 to allow the H₂ and O₂ to separate and be pulled off separately via gravity separation.

Thus, the high pressure proton exchange membrane based water electrolyzer system 10 may further include an oxygen outlet 15 and a hydrogen outlet 17 that replaces the gas outlet 16 to remove the hydrogen and oxygen gas separately from the interior portion 20, as opposed to separating the hydrogen and oxygen gas after removal from the vessel 10 in FIGS. 1-3.

In this exemplary embodiment, the interior portion 20 may further be differentiated into a first interior portion 35 and a second interior portion 45 separated by a screen portion 55, wherein the MEA 38 and the water inlet 14 are included in the first interior portion 35 and wherein the oxygen outlet 15, the hydrogen outlet 17, a water level sensor 19 and a hydrogen/oxygen interface sensor 21 are included in the second interior portion 45. The water level entering the first interior portion 35 (as determined by the water level sensed by the water level sensor 19) may be continuously adjusted with a high pressure water injection pump and the hydrogen and oxygen gas bled off through the hydrogen outlet 17 and the oxygen outlet 15 to keep the hydrogen/oxygen gas interface centered about hydrogen/oxygen interface sensor 21.

Further, a plurality of non-conductive spheres 65 may be contained within the second interior portion 45. The spheres 65 may aid in further separating the hydrogen gas and oxygen gas via size exclusion (in addition to gravity separation).

Figure 5:
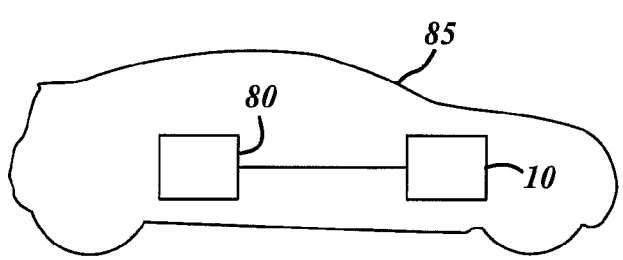
FIG. 5 is a plan view of an electric vehicle including a high pressure proton exchange membrane based water electrolyzer system according to either the exemplary embodiment of FIG. 1 or FIG. 4.

The above exemplary embodiments disclose high pressure proton exchange membrane based water electrolyzer system 10 that may be utilized in various applications for generating high pressure hydrogen and oxygen gas. One exemplary application for the high pressure proton exchange membrane based water electrolyzer system 10 of either exemplary embodiment is for use is for providing hydrogen gas for use in a fuel cell 80 of an electric vehicle 85, as shown in FIG. 5.

The above description of embodiments of the invention is merely exemplary in nature and, thus, variations thereof are not to be regarded as a departure from the spirit and scope of the invention.

What is claimed is:

1. A product comprising a high pressure proton exchange membrane based water electrolyzer system comprising:
   an outer electrode having an interior region and a water inlet;
   a gas outlet coupled within another portion of said outer electrode;
   a center electrode coupled within said interior region, said center electrode electrically coupled to said outer electrode through a direct current power source;
   a membrane electrode assembly spiral wound around said center electrode within said interior region, said membrane electrode assembly including a plurality of proton exchange membrane cells electrically coupled in series, each of said plurality of proton exchange membrane cells coupled to a proton exchange membrane, wherein an innermost one of said plurality of proton exchange membrane cells may be electrically coupled to said center electrode and wherein an outermost one of said plurality of proton exchange membrane cells may be electrically coupled to said outer electrode; and
   a non-conductor separator member wound around said center electrode and coupled to said center electrode and said outer electrode, said non-conductor separator membrane preventing electrical contact between said plurality of proton exchange membrane cells.

2. The product of claim 1, wherein said center electrode comprises a cathode electrode and wherein said outer electrode comprises an anode electrode.

3. The product of claim 1, wherein said center electrode comprises an anode electrode and wherein said outer electrode comprises a cathode electrode.

4. The product of claim 1, wherein each of said plurality of proton exchange membrane cells comprises a cathode electrode and an anode electrode, and each of the cathode and the anode comprises at least one catalyst layer including a proton conducting ionomer intermingled with catalyst particles.

5. The product of claim 1, wherein said interior portion is separated into a first interior portion and a second interior portion by a wire screen, wherein said membrane electrode assembly is entirely contained within said first interior portion; and
   wherein said second interior portion may include a plurality of non-conductive spheres.

6. The product of claim 5, wherein said gas outlet comprises an oxygen gas outlet and a hydrogen gas outlet and wherein the hydrogen gas outlet is at higher elevation than the oxygen outlet to allow separation of oxygen and hydrogen gases through gravity stratification.

7. The product of claim 1 further comprising:
   a check valve coupled to said water inlet for controlling the flow of water into said interior portion, said check valve movable from a closed position to an open position; and
   a water level sensor for measuring water levels within said interior portion, wherein said water level sensor is coupled to said check valve and controls the positioning of said check valve between said open position and said closed position.

8. The product of claim 1, wherein said proton exchange membrane comprises a sulfonic perfluorocarbon proton conductive membrane.

9. The product of claim 1 further comprising a fuel cell coupled to said high pressure proton exchange membrane based water electrolyzer system.

10. The product of claim 1 further comprising an electric vehicle comprising said high pressure proton exchange membrane based water electrolyzer system.

11. The product of claim 1 further comprising an electric vehicle comprising a fuel cell coupled to said high pressure proton exchange membrane based water electrolyzer system of claim 1.

12. A method for generating hydrogen gas and oxygen gas from water, the method comprising:
   (a) forming a high pressure proton exchange membrane based water electrolyzer system comprising:
   an outer electrode having an interior region;
   a water inlet coupled within a portion of said outer electrode;
   a gas outlet coupled within another portion of said outer electrode;
   a center electrode coupled within said interior region, said center electrode electrically coupled to said outer electrode through a direct current power source;
   a membrane electrode assembly spiral wound around said center electrode within said interior region, said membrane electrode assembly including a plurality of proton exchange membrane cells electrically coupled in series, each of said plurality of proton exchange membrane cells coupled to a proton exchange membrane, wherein an innermost one of said plurality of proton exchange membrane cells may be electrically coupled to said center electrode and wherein an outermost one of said plurality of proton exchange membrane cells may be electrically coupled to said outer electrode; and a non-conductor separator member wound around said center electrode and coupled to said center electrode and said outer electrode, said non-conductor separator membrane preventing electrical contact between said plurality of proton exchange membrane cells on;

(b) introducing a first amount of water within said interior region from said water inlet;

(c) activating said direct current power source to provide a voltage across said center electrode and said outer electrode, said voltage being sufficient to cause said first amount of water to react to produce a first amount of oxygen gas and a first amount of hydrogen gas; and (d) removing said first amount of oxygen gas and said first amount of hydrogen gas through said gas outlet.

13. The method of claim 12, wherein said center electrode comprises a cathode electrode and wherein said outer electrode comprises an anode electrode.

14. The method of claim 12, wherein said center electrode comprises an anode electrode and wherein said outer electrode comprises a cathode electrode.

15. The method of claim 12 further comprising:
separating said interior region into a first region and a second region using a wire screen, wherein said membrane electrode assembly is located within said first region; and
introducing a plurality of non-conductive spheres within said second region to aid in separating said first amount of oxygen gas from said first amount of hydrogen gas.

16. The method of claim 15, wherein (d) removing said first amount of oxygen gas and said first amount of hydrogen gas through said gas outlet comprises:
(d) removing said first amount of oxygen gas through an oxygen gas outlet; and
(e) removing said first amount of hydrogen gas through a hydrogen gas outlet.

17. The method of claim 16 further comprising:
coupling a hydrogen/oxygen interface sensor within a portion of said second region between said hydrogen outlet and said oxygen outlet;
determining a hydrogen gas and oxygen gas interface within said second region; and
removing a portion of said first amount of oxygen gas through said oxygen outlet, or removing a portion of said first amount of hydrogen gas through said hydrogen, to maintain said hydrogen gas and oxygen gas interface approximately centered as said hydrogen/oxygen interface sensor.

18. The method of claim 13, further comprising:
determining an amount of water contained within said interior region;
introducing a further amount of water within said interior region when said determined amount of water falls below a predetermined threshold level.

19. An electric vehicle comprising:
a high pressure proton exchange membrane based water electrolyzer system comprising:
an outer electrode having an interior region;
a water inlet coupled within a portion of said outer electrode;
a gas outlet coupled within another portion of said outer electrode;
a center electrode coupled within said interior region, said center electrode electrically coupled to said outer electrode through a direct current power source;
a membrane electrode assembly spiral wound around said center electrode within said interior region, said membrane electrode assembly including a plurality of proton exchange membrane cells electrically coupled in series, each of said plurality of proton exchange membrane cells coupled to a proton exchange membrane, wherein an innermost one of said plurality of proton exchange membrane cells may be electrically coupled to said center electrode and wherein an outermost one of said plurality of proton exchange membrane cells may be electrically coupled to said outer electrode; and
a non-conductor separator member wound around said center electrode and coupled to said center electrode and said outer electrode, said non-conductor separator membrane preventing electrical contact between said plurality of proton exchange membrane cells; and
a fuel cell fluidly coupled to said high-pressure hydrogen gas generator through said gas outlet.

20. The electric vehicle of claim 19, wherein said center electrode comprises a cathode electrode and wherein said outer electrode comprises an anode electrode.

21. The electric vehicle of claim 19, wherein said center electrode comprises an anode electrode and wherein said outer electrode comprises a cathode electrode.

22. The electric vehicle of claim 19, wherein each of said plurality of proton exchange membrane cells comprises a cathode electrode and an anode electrode.

23. The electric vehicle of claim 19, wherein said interior portion is separated into a first interior portion and a second interior portion using a wire screen, wherein said membrane electrode assembly is entirely contained within said first interior portion; and
wherein said second interior portion may include a plurality of non-conductive spheres.

24. The electric vehicle of claim 23, wherein said gas outlet comprises an oxygen gas outlet and a hydrogen gas outlet separately coupled to said outer electrode and in fluid communication with said second interior portion.

25. The electric vehicle of claim 19 further comprising:
a check valve coupled to said water inlet for controlling the flow of water into said interior portion, said check valve movable from a closed position to an open position; and
a water level sensor for measuring water levels within said interior portion, wherein said water level sensor is coupled to said check valve and controls the positioning of said check valve between said open position and said closed position.

26. The electric vehicle of claim 19, wherein said proton exchange membrane comprises a sulfonic perfluorocarbon proton conductive membrane.

* * * * *